United States Patent [19]

Nagata et al.

[11] Patent Number: 5,294,523
[45] Date of Patent: Mar. 15, 1994

[54] OPTICAL INFORMATION RECORDING MEDIUM

[75] Inventors: Ken'chi Nagata, Neyagawa; Susumu Sanai, Osaka; Noboru Yamada, Hirakata; Masatoshi Takao, Osaka, all of Japan

[73] Assignee: Matsushita Electric Industrial Co., Ltd., Osaka, Japan

[21] Appl. No.: 57,419

[22] Filed: May 6, 1993

Related U.S. Application Data

[63] Continuation of Ser. No. 935,473, Aug. 26, 1992, abandoned, which is a continuation of Ser. No. 385,361, Jul. 27, 1989, abandoned.

[30] Foreign Application Priority Data

Aug. 1, 1988 [JP] Japan .................. 63-192498

[51] Int. Cl.$^5$ .................. G11B 7/24; G03C 3/00
[52] U.S. Cl. .................. 430/495; 430/19; 430/945; 430/346; 369/275.2; 369/288
[58] Field of Search .................. 430/19, 270, 346, 495, 430/945; 346/135.1; 369/275.2, 288

[56] References Cited

U.S. PATENT DOCUMENTS

| | | | |
|---|---|---|---|
| 3,801,966 | 4/1974 | Terao | 365/113 |
| 4,310,899 | 1/1982 | Biesterbos et al. | 365/113 |
| 4,385,305 | 5/1983 | Terao et al. | 346/135.1 |
| 4,430,659 | 2/1984 | Maffitt et al. | 346/135.1 |
| 4,433,340 | 2/1984 | Mashita et al. | 346/135.1 |
| 4,478,768 | 10/1984 | Takeoka | 264/1.4 |
| 4,499,178 | 2/1985 | Wada et al. | 430/495 |
| 4,647,944 | 3/1987 | Gravesteijn et al. | 346/135.1 |
| 4,670,345 | 6/1987 | Morimoto et al. | 430/945 |
| 4,719,594 | 1/1988 | Young et al. | 430/945 |
| 4,808,514 | 2/1989 | Gravesteijn et al. | 430/495 |
| 4,835,048 | 5/1989 | Maeda et al. | 428/323 |
| 5,024,910 | 6/1991 | Ohta et al. | 430/495 |

FOREIGN PATENT DOCUMENTS

| | | |
|---|---|---|
| 60-106031 | 6/1985 | Japan . |
| 61-258787 | 11/1986 | Japan . |
| 61-270190 | 11/1986 | Japan . |
| 62-209742 | 9/1987 | Japan . |

*Primary Examiner*—Charles L. Bowers, Jr.
*Assistant Examiner*—Martin J. Angebrannt
*Attorney, Agent, or Firm*—Stevens, Davis, Miller & Mosher

[57] ABSTRACT

A rewritable phase-change type optical information recording medium having a recording film made of a material containing Te or In as a major component and further containing B or C.

4 Claims, 12 Drawing Sheets

$$(Ge_x Sb_y Te_z)_{1-a} B_a$$

$0.10 \leq x \leq 0.35 \quad 0.10 \leq y$
$0.45 \leq z \leq 0.65 \quad x + y + z = 1$
$0 < a \leq 0.4$

LASER BEAM

LASER BEAM

F I G. 6a
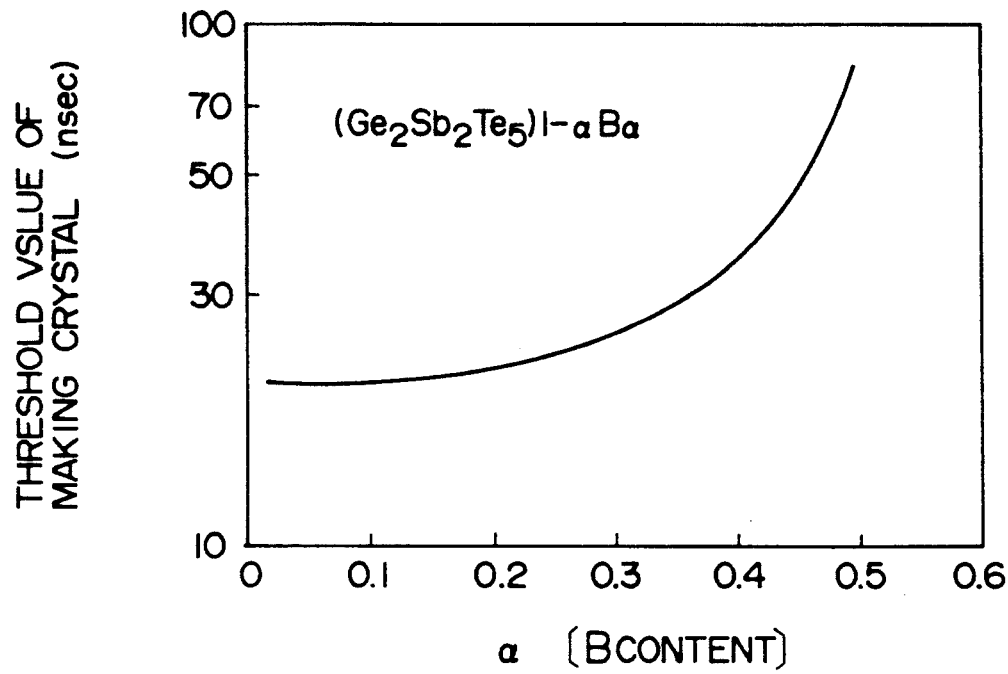
F I G. 6b
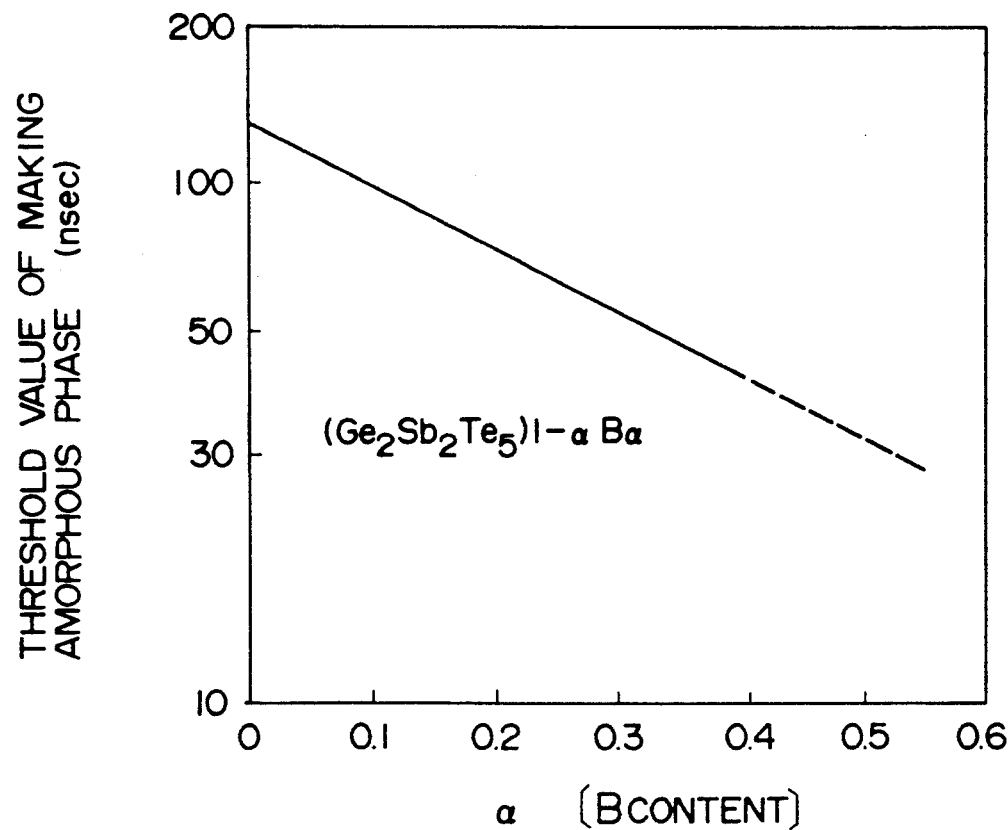

F I G. 9b
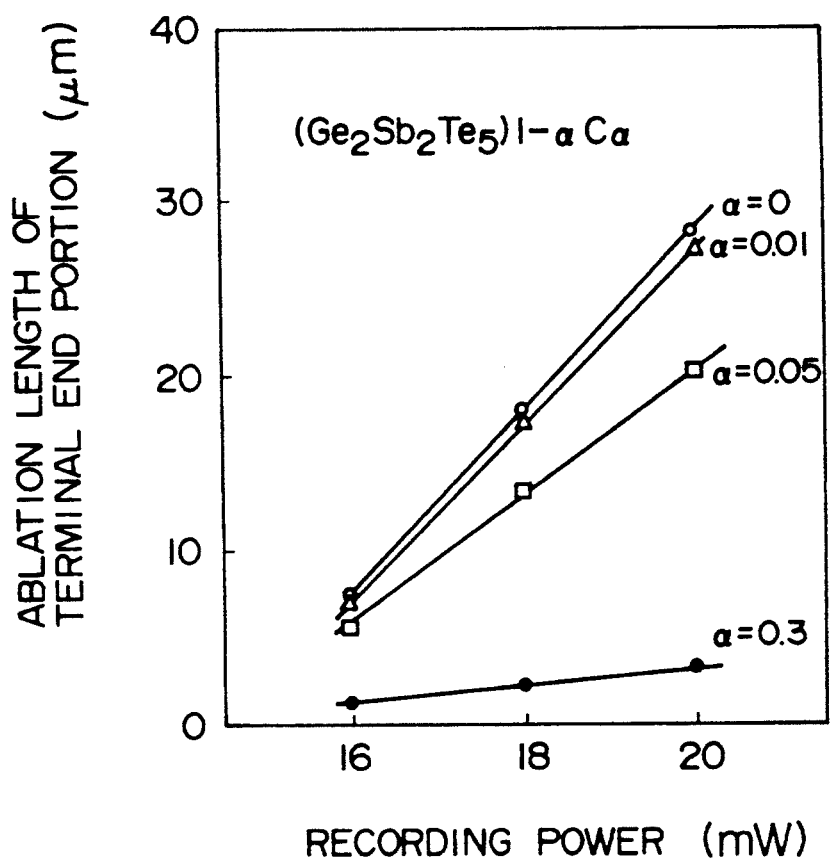

OPTICAL INFORMATION RECORDING MEDIUM

This application is a continuation of application Ser. No. 07/935,473, filed Aug. 26, 1992, now abandoned, which in turn is a continuation of application Ser. No. 07/385,361, filed Jul. 27, 1989, now abandoned.

BACKGROUND OF THE INVENTION

1. Field of the Invention

The present invention relates to an optical information recording medium for use in an information recording/reproducing apparatus making use of a laser beam, particularly to a rewritable optical disk.

2. Description of the Related Art

A phase-change type optical disk has been known having a recording film made of chalcogenide which enables recording, reproduction and erasing of information signals.

In ordinary erasable phase-change type optical disk apparatus, signals are recorded in a recording medium in an amorphous state, while a crystalline state of the medium is obtained after erasing of signals.

Materials containing Te or In as major components have been practically and broadly used as the material of recording films on recording mediums of the kind described. In particular, a thin film of a Ge-Sb-Te type ternary alloy can be crystalized in quite a short period of 100 nsec or shorter upon irradiation with light together with heat, provided that the composition is suitably selected. This type of alloy is disclosed in Japanese Patent Unexamined Publication No. 62-209742. In general, a shorter crystallization time, i.e., a shorter erasing time, contributes to a higher signal transfer rate. Thus, theoretically, a very short crystallization time enables over-writing with a single beam, namely, simultaneous writing and erasing of signals by a single laser beam with a suitable intensity modulation. In fact, a phase-change type optical disk having a recording film of a Ge-Sb-Te type ternary alloy of a suitable composition enables over-writing with a single beam, by virtue of its very high crystallization speed, as discussed in Japanese Patent Unexamined Publication No. 62-209742.

The number of repetition of recording and erasing of information in a phase-change type optical disk can be increased by suitably selecting and optimizing conditions such as the material of the recording film construction of the disk, levels of the recording power and erasing power, and so forth. However, optical disks are not always used under optimum conditions. In particular, optical disks for personal use are used under various conditions. Thus, it is desirable that optical disks are used with high reproducibility of operation characteristics even when used under a varying condition such as offset of the power from an optimum level.

The present inventors have conducted experiments for the purpose of examining how the performance of optical disks having recording films mainly composed of Te or In are influenced by deviation of the recording and erasing power levels. As a result, the inventors have found that the deviation of the power levels from optimum levels tends to lead to destruction of the recording film and limitation in the number of cycles of repetition of recording and erasing.

SUMMARY OF THE INVENTION

Accordingly, an object of the present invention is to provide an optical information recording medium having improved characteristics of repetition of recording and erasing.

To this end, according to the present invention, there is provided an optical information recording medium having a recording film, wherein B or C is added to the material of said recording film; and/or a B layer or a C layer is provided in contact with the recording film; and/or B or C is added to the material of a protective layer formed in contact with the recording film.

Thus, the optical information recording medium of the present invention features addition of B or C to the material of the recording film, and/or provision of a B layer or a C layer in contact with the recording film, and/or addition of B or C to the material of a protective layer formed in contact with the recording film. This feature offers an effect that the tendency of destruction of recording film is remarkably reduced when the recording medium is used repeatedly under application of a recording power of a level higher than the optimum level.

The present invention, therefore, provides an optical information recording medium which exhibits an excellent performance against repeated recording and erasing, while widening the range of fluctuation of the recording power.

BRIEF DESCRIPTION OF THE DRAWINGS

FIG. 6 is a graph showing crystallization and amorphous characteristics as exhibited by a $Ge_2Sb_2Te_5$ recording film with addition of B;

FIGS. 9(a), 9(b) and 11(a), 11(b) are illustrations effects on the prevention of ablation of characteristics by repetition of recording and erasing, produced by addition of B and C, respectively;

DESCRIPTION OF THE PREFERRED EMBODIMENTS

Figure 1A:
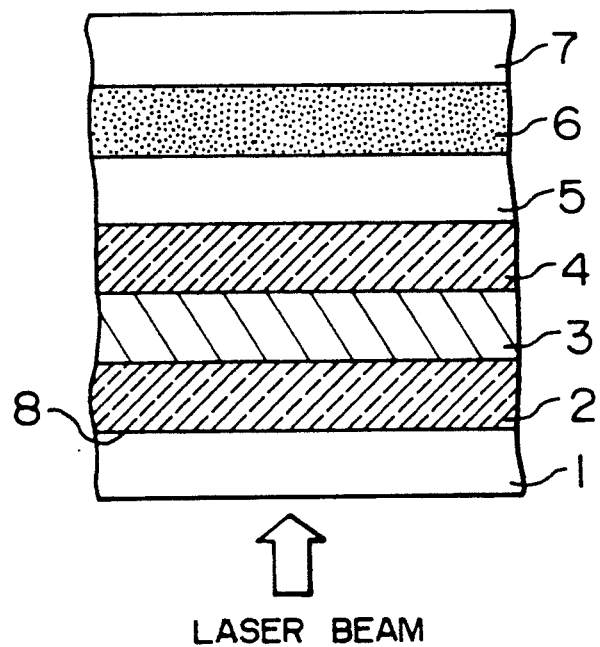
FIG. 1 is a sectional view of a recording medium.

Rewritable phase-change type optical disks composed mainly of Te or In often exhibit defects in that the recording film is destroyed at ends of the recording and reproducing region, i.e., at ends of a region where a series of signals is recorded, after repeated recording and reproduction. This phenomenon will be referred to as "ablation at ends of recording region" hereinafter. The ablation at ends of recording region can be attributable to the fact that the elements of the material of the recording film is diffused and moved in the radial and circumferential directions of the disk upon each irradiation with the laser beam, the movement of the elements being accumulated during long use in which recording and erasing are executed repeatedly. This phenomenon is serious particularly when the level of the recording power is high. As a measure for overcoming this problem, it has been attempted to add some elements to the material of the recording film. Tests were conducted by using elements of second to 6th periods of the periodic table except the groups Ia and 0 to examine the effects of addition of these elements. The tests showed that addition of B and addition of C provides a superb effect. Namely, it was confirmed that the ablation at the ends of the recording region is remarkably suppressed by addition of B or C in a suitable amount. It was also confirmed that this effect is remarkable particularly when the recording medium is used with recording power of a level slightly higher than the optimum level. In addition, no reduction in the crystallization speed was caused by the addition of B or C.

The inventors also found, through an intense study, that the tolerance of the level of the recording power can be widened by various measures for incorporating B or C, e.g., by provision of a B or C layer between the recording film and the protective layer.

There are infinite number of compositions of phase-change type recording film composition which enables recording and erasing, composed mainly of Te or In. It is practically impossible to confirm the effect of addition of B or C to all these possible compositions. The materials of phase-change type recording film composition which enables recording and erasing, composed mainly of Te or In can be broadly sorted into the following six types: namely, Te-Sb type, Te-Ge type, Te-Se type, In-Te type, In-Sb type and In-Se type. Effects of addition of B and C were tested on typical thin film compositions of the respective types mentioned above. Appreciable effect in suppression of the ablation was confirmed in each case. From the results of studies and tests, it is understood that addition of B or C to the phase-change type recording film capable of repeatedly performing recording and erasing, mainly composed of Te or In, produces a remarkable effect in that the degradation of the performance due to repeated recording and erasing, particularly the ablation at ends of the recording region, is suppressed although the addition may partially impair the recording or erasing characteristics of the phase-change type recording film.

As described before, in usual use of erasable phase-change type optical recording device, amorphous and crystalline states of the recording film respectively correspond to a stable holding of information recorded therein and a state after erasing of the information. This, however, is not exclusive and the arrangement may be such that any two different optically distinguishable states correspond to a state holding the recorded information and a state after erasing of the information. To obtain at least one of the two states, it is necessary to irradiate the recording film with a laser beam so as to melt the film or to raise the temperature of the recording film to a level above the phase-change transition temperature. Diffusion of the constituent elements of the recording film is liable to occur when the recording film is in molten state or kept at a high temperature. In other words, a phase-change type optical disk capable of being used through repeated recording and erasing inherently has a possibility of ablation during repeated recording and erasing, due to its recording and erasion mechanism. In order to suppress the ablation, therefore, it is considered to add an element which suppresses diffusion movement of elements of the elements at the time of irradiation with the laser beam. It is preferred that the element to be added does not form any solid solution with other element or elements inherentily contained in the material of the recording film. B and C have melting points of about 2700° C. and about 3600° C. which are very high, so that it is understood that these elements B and C existing in the recording film or in the boundary surface of the same are not molten even under irradiation with a laser beam. The B and C, which are not molten by the heat generated by irradiation with laser beam act to prevent diffusion movement of other elements of the recording film, thus suppressing any tendency for the recording medium to be degraded at the ends of the recording region. Thus, addition of B or C is effective in suppression of ablation due to repeated recording and erasing in phase-change type recording film intended for repeated recording and erasion, regardless of the kinds of basic constituents.

It is to be noted, however, that not all of the elements having high melting points produce the above-described effect. It has been confirmed through experiment that high-melting point elements such as W and Mo can provide only a small effect in the prevention of ablation due to repeated recording and erasing. The fact confirmed through experiments is that B and C from among the elements of 2nd to 6th periods of the periodic table other than Ia and O group provide a specifically large effect in suppressing ablation tendency of the recording region due to repeated recording and erasing and that the use of these elements B and C is recommended from a practical point of view.

FIG. 1(a) shows the construction of a typical example of the recording medium of the present invention. The recording medium has a substrate 1 through which a laser beam for recording and reproduction and erasing of information is applied.

The substrate 1 is a member having a smooth surface and is made of, for example, a plastic material such as PMMA (polythylmethacrylate) or polycarbonate, glass or the like. When the recording medium is an optical disk, the surface 8 of the substrate is covered by a spiral track or tracks in the form of concentric circles.

The recording thin film 3 is made of a phase-change type material composed mainly of Te or In and containing B or C. Examples of the phase-change type material are Te-Sb-Ge, Te-Ge, Te-Ge-Sn, Te-Ge-Sn-Au, Sb-Te, Sb-Se-Te, In-Te, In-Se, In-Se-Tl, In-Sb, In-Sb-Se, and In-Sb-Te, in each of which B or C is added.

The recording medium also has protective layers 2 and 4 which are made of one of the following dielectric materials or a combination of two or more of the same: $Al_2O_3$, $SiO_2$, $SiO$, $TeO_2$, $MoO_3$, $WO_3$, $ZnS$, $SiN$, $PbF_2$ and $MgF_2$. Basically, the phase-change type recording medium has a substrate and a recording film which is formed on the substrate and which enables recording and erasing. In most cases, however, the recording medium further has a protective layer or layers in contact with the recording film. One of the functions of the protective layers is to prevent destruction of the recording film 3 under repetition of recording and erasing. Another function is to enhance the light absorption of the recording film 3 by making use of multiple interference effect. Provision of a protective layer is effective also in that it enhances the difference between the quantity of light reflected from the recording film in which information has been recorded and the quantity of light reflected from the same when no information is recorded, thereby to improve signal-to-noise ratio.

A reflective layer 5 is made of a metallic element such as Au, Al, Ni, Fe, Cr or Ti or an alloy of such element or elements, and serves to enhance the light absorption by the recording film 3. The provision of the reflective layer 5 is not essential. Namely, the reflective layer 5 may be dispensed with provided that the light absorption efficiency of the recording film is increased by increasing the thickness of the recording film.

A protective substrate 7 can be formed by spin coating with a plastic material or by bonding a plastic sheet, glass sheet or a metal sheet similar to the substrate 1 by means of an adhesive 6.

It is possible to bond a pair of recording medium sheets at their reflective layers or with an intermediary of an intermediate substrate by means of an adhesive, thus obtaining a double-sided construction which enables recording, reproduction and erasion from both sides.

The layer described above can be formed by a suitable method or methods such as electron-beam evaporation method, sputtering, ion-plating and CVD method.

The inventors have conducted experiments to examine the manner in which the crystallization sensitivity (erasion sensitivity) and amorphous sensitivity (recording sensitivity) are changed as a result of addition of B or C in all the recording films obtained through the above-described method.

The crystallization sensitivity was measured by a static evaluation method. Test pieces of constructions equivalent to an optical disk were prepared by forming, on a glass substrate, a protective layer, a recording film and a reflective layer. Then, characteristics of the test pieces were measured by irradiating these test pieces with a laser beam of a wavelength restricted to the limit of the laser beam, while keeping the test pieces stationary. More specifically, each test piece was irradiated with a laser pulse of a specific intensity and whether any change of reflectivity was caused was measured. The minimum pulse width capable of causing a change in the reflectivity was measured and used as a crystallization threshold.

The test piece thus crystallized was then irradiated with a laser beam, and a measurement similar to that in the crystallization process was conducted to determine the threshold for formation of amorphous phase.

Dynamic evaluation also was conducted by fabricating actual optical disks and subjecting them to repeated recording and erasing to measure the characteristics of the optical disks.

As described before, when Ge-Sb-Te type ternary composition is used as the material of the recording film, the composition has to be determined to meet the following requirements: namely, high stability of amorphous phase, i.e., high stability of recorded signals, high crystallization speed, and high reproducibility of characteristics during repeated recording (amorphous state) and erasing (crystallization).

Figure 2:
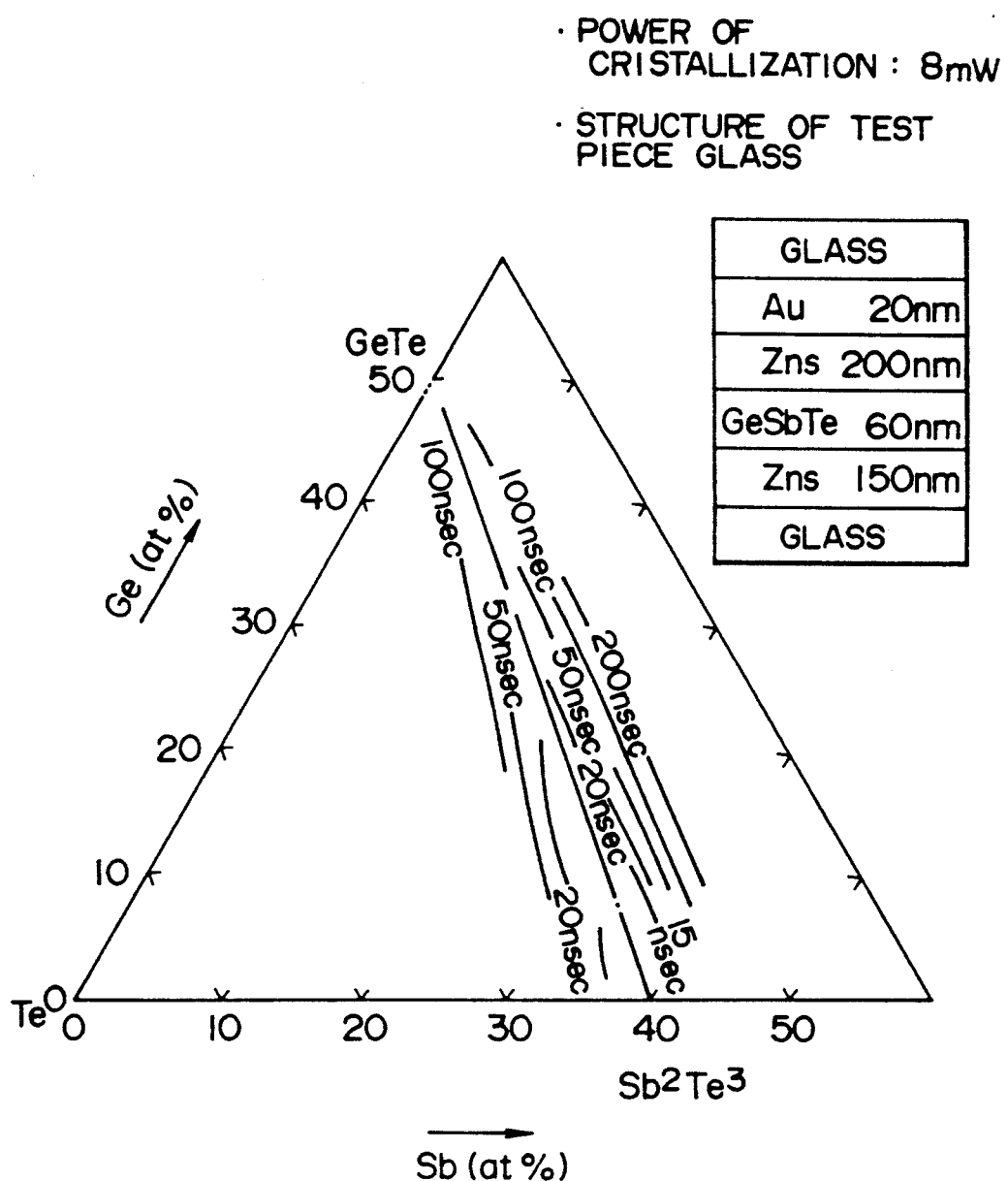
FIG. 2 is a graph showing the relationship between the crystallization speed and the Ge-Sb-Te type ternary thin film.

FIG. 2 shows the relationship between the composition of a recording film made of a Ge-Sb-Te type ternary composition and the crystallization speed.

It is understood that a high crystallization speed is exhibited particularly by a composition which is expressed by $(GeTe)_\alpha(Sb_2Te_3)_{1-\alpha}$. From the view point of stability against repeated recording and erasing, it is understood that a long life of the recording film is obtained against repeated recording and erasing when the composition is $Ge_2Sb_2Te_5$, $GeSb_2Te_4$, $GeSb_4Te_7$ or a composition therearound.

Figure 3:
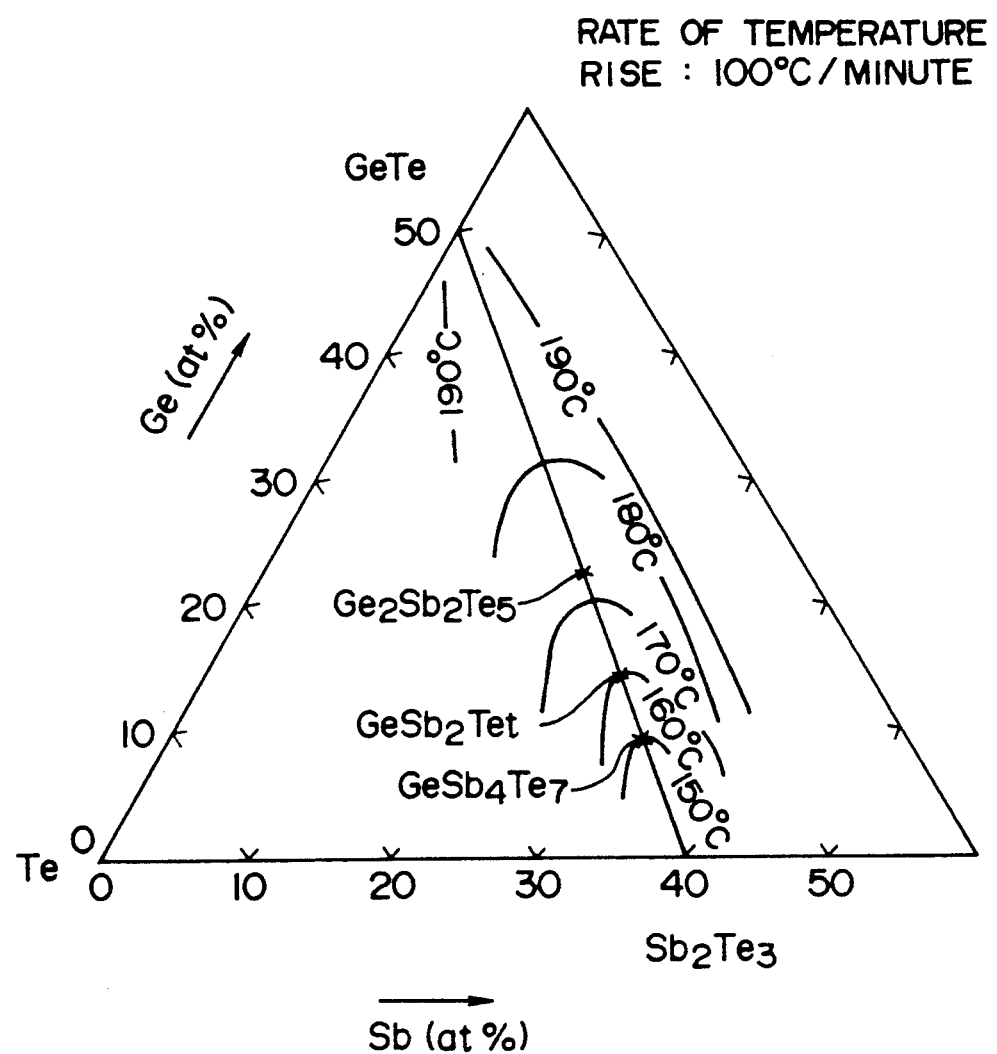
FIG. 3 is a graph showing the relationship between the crystallization temperature and the Ge-Sb-Te type ternary thin film.

FIG. 3 shows the dependency of the crystallization temperature on the composition. The crystallization temperature was measured as the temperature at which crystallization is commenced when the temperature is raised at a rate of 100° C./min. This characteristic is used as an index of the stability of the amorphous phase. It is understood that an alloy expressed by, for example, $Ge_2Sb_2Te_5$ exhibits a high crystallization temperature of 170° C. or higher, thus providing a high stability of amorphous phase.

Excellent recording/erasing characteristics, as well as high stability against repeated recording and erasing, were obtained by optical disks having recording films of compounds expressed by $Ge_2Sb_2Te_5$ or therearound. In particular, the recording film of $Ge_2Sb_2Te_5$ showed specifically high stability against repeated recording and erasing, as mentioned also in Japanese Patent Unexamined Publication No. 62-209742.

The inventors also conducted various studies and discussions for attaining improvement in the characteristics of disks, in particular a greater tolerance of the recording power level against any change of the disk characteristics caused by repeated recording and erasing.

The invention will be more fully understood from the following description of examples.

EXAMPLE 1

Disk test pieces having recording films of compositions expressed by $(Ge_2Sb_2Te_5)_{100-\alpha}B_\alpha$ was prepared and crystallization sensitivity and amorphous-phase forming sensitivity of the test piece were measured.

The construction of the disk test pieces were as shown in FIG. 1(a). The substrate was made of a glass sheet. The recording film had a film thickness of 60 nm and was sandwiched by protective layers of ZnS on both sides thereof. The thickness of the protective layers were determined so that optically most appropriate characteristics were obtained. More specifically, the thickness of the protective layer 2 provided at the side of the substrate 1 was 150 nm, the thickness of the other protective layer 4 at the opposite side was 200 nm, the reflective layer made of Au being 20 nm in thickness.

Figure 4:
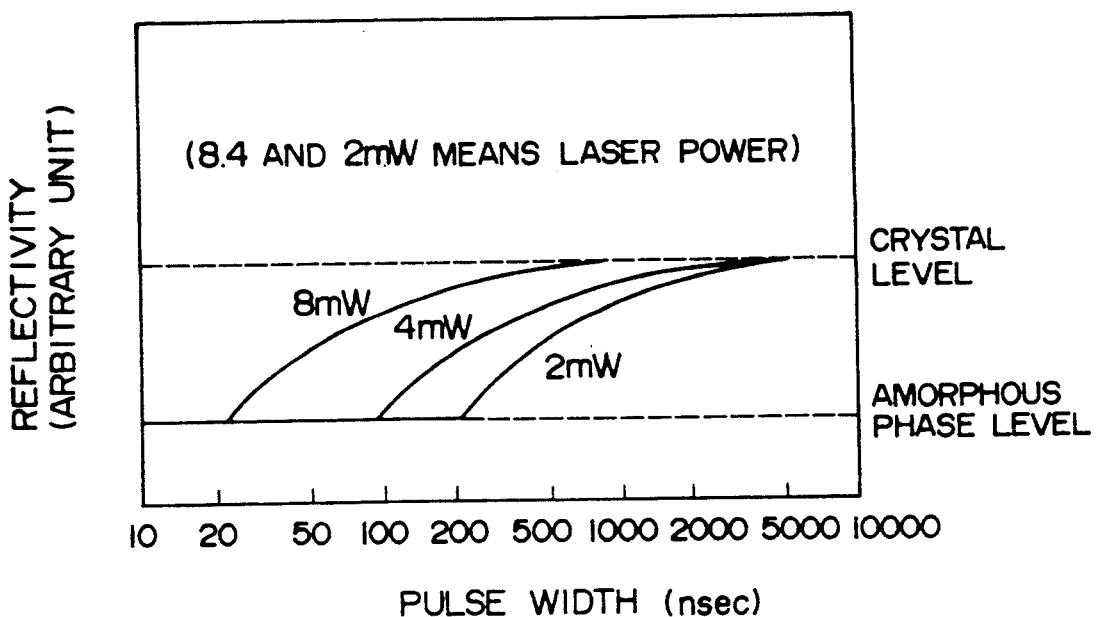
FIG. 4 is a chart showing static crystallization characteristic.

In FIG. 4 there were shown the results of tests of crystallization characteristics measured regarding test pieces each having a recording film having composition of $(Ge_2Sb_2Te_5)_{0.85}B_{0.15}$ by use of static evaluation. The measurement of the crystallization sensitivity was commenced with application of a single pulse (wavelength 830 nm) of a pulse width of 100 nsec at a power level of 20 mW. It was confirmed that as a result of the application of the pulse, the recording film was molten and then quenched to recover the amorphous state. Subsequently, a laser beam of a lower power level was applied and the state of crystallization was examined. As will be seen from FIG. 4, the pulse width at which the crystallization is commenced is progressively shifted to the shorter side as the power of the laser is increased from 2 mW to 8 mW. This effect, however, is substantially saturated, i.e., the shortening of the pulse width is not obtained, when the laser beam power level is increased beyond 8 mW. In this example, a crystallization start threshold of 20 nsec was obtained with a laser power of 8 mW.

Figure 5:
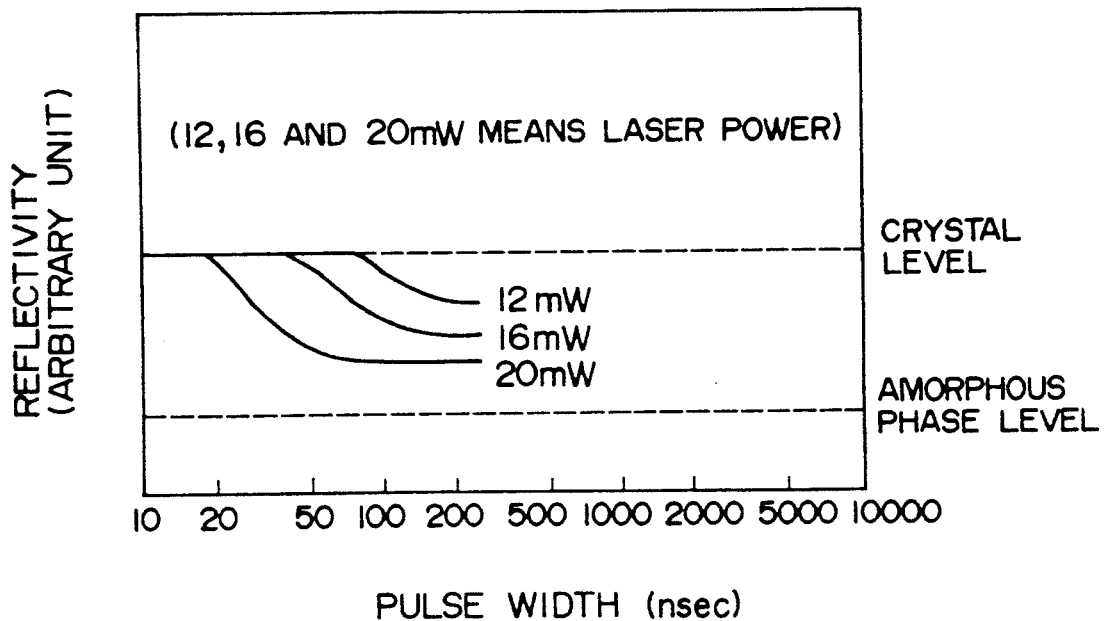
FIG. 5 is a chart showing static amorphous-state forming characteristic.

To examine the amorphous-phase forming characteristic, a single pulse of a pulse width of 2 μsec was applied at a power level of 4 mW so as to sufficiently crystallize the recording film and then a laser beam of a higher power level was applied to the same portion. FIG. 5 shows the result of this test conducted on a test piece having a recording film of $(Ge_2Sb_2Te_5)_{0.85}B_{0.15}$. It will be seen that a change in the reflectively is caused when the pulse width is greater than 80 nsec when the power level is 12 mW, thus proving the formation of amorphous phase.

FIGS. 6(a) and 6(b) show, respectively, the dependencies of the thus measured threshold values for crystallization and formation of amorphous phase on the amount of B added to the material.

From these figures, it is understood that the crystallization start threshold of the film composition $(Ge_2Sb_2Te_5)_{1-a}B_a$ does not have substantial dependency on the amount of B when the factor $a$ is not greater than 0.4 ($a \leq 0.4$), but the threshold value is drastically increased in the region of $a > 0.4$. The drastic increase in the threshold value means a drastic reduction in the crystallization sensitivity. On the other hand, the threshold value for the start of formation of amorphous phase is decreased in accordance with increase in the amount of B. The reduction of this threshold value means an improvement in the sensitivity for formation of amorphous phase.

Recording films as test pieces were formed to have compositions expressed by $(Ge_2Sb_2Te_5)_{1-a}B_a$ by vacuum evaporation, and dynamic characteristics of these test pieces were measured. The thickness of each recording film was 60 nm, while the protective layers on the substrate and on the reflective layer had thicknesses of 150 and 200 nm, respectively. ZnS was used as the material of these protective layers. The reflective layer was formed from Au in a thickness of 20 nm. The disks were formed from polycarbonate in the size of 5.25 inches and were driven at a speed of 10 m/sec relative to the laser beam (wavelength 830 nm).

Figure 7:
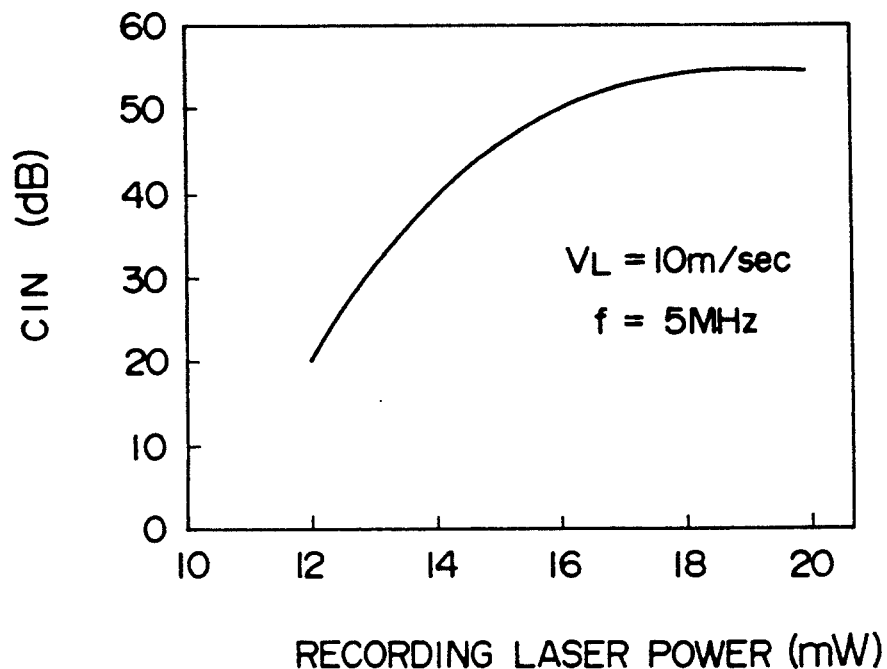
FIG. 7 is a chart showing dynamic recording characteristic.

FIG. 7 shows, by way of example, the relationship between the writting power and the carrier-to-noise ratio as observed when information was written with a writing signal frequency of 5 MHz in a disk having a recording film of $(Ge_2Sb_2Te_5)_{0.85}B_{0.15}$. It will be seen from this figure that the carrier-to-noise ratio increase beyond 45 dB when the recording power level is 15 mW or higher. A test conducted with varying value of B content showed that carrier-to-noise ratio of 45 dB or higher is obtained when the B content is not greater than 60% ($B \leq 60\%$).

Figure 8:
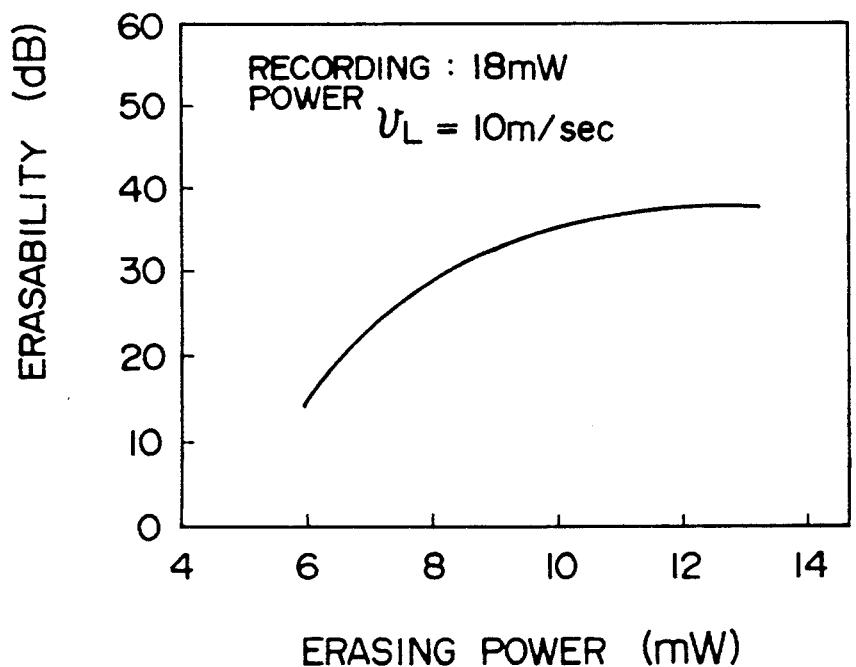
FIG. 8 is a chart showing dynamic erasing characteristic.

FIG. 8 shows, by way of example, erasing characteristic of a disk having a recording film of $(Ge_2Sb_2Te_5)_{0.85}B_{0.15}$. The axis of abscissa represents the power of the erasing laser beam, while the axis of ordinate represents erasability. The laser beam used for erasing had a circular cross-section and Gauss power distribution. After recording signals with a recording laser power of 18 mW, the laser beam was applied in a D.C. manner so as to crystallize the recording film thereby erasing the signals. Since the time required for crystallization, i.e., the erasing, is as short as that for the signal recording, crystallization of the recording portion, i.e., erasing, can be conducted satisfactorily even with the same laser spot as that used for the recording. That is, so-called over-writing with a single beam is possible. Erasing characteristics were measured while varying the B content. It was confirmed that an erasability of 25 dB or higher is obtainable with the B content which meets the condition of $B \leq 40\%$. When the B content exceeds 40%, the erasability is reduced to 25 dB or lower which is inconvenient when the disk is intended for repetition of recording and erasing.

Figure 9A:
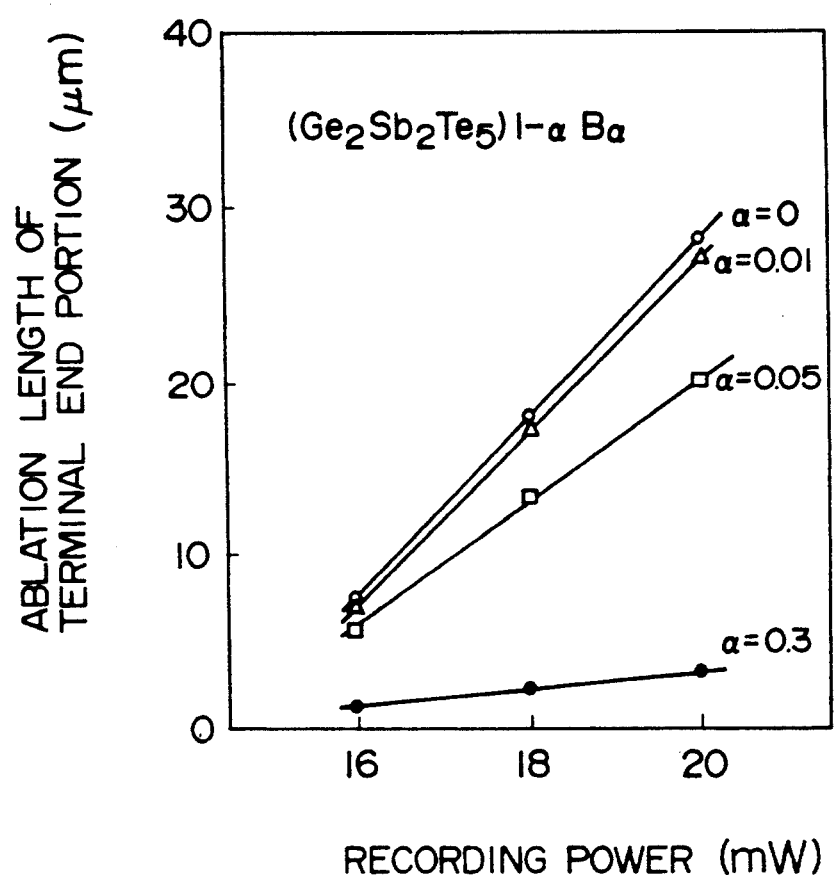

An experiment also was conducted for the purpose of examining the stability against repeated recording and erasing. FIG. 9(a) shows the relationship between the level of the recording power and the length of the degraded portion at end of the recording region, i.e., the length of the portion in which the amplitude of the signal obtained by reproducing a recorded mark is decreased, as observed after 10,000 over-writing cycles conducted at 5 MHz. FIG. 9(a) shows the relationship between the ablation length of the terminal end portion and the recording power when $a$ in the formula $(Ge_2Sb_2Te_5)_{1-a}B_a$ is 0, 0.01, 0.05 and 0.3. From FIG. 9(a), it will be understood that the ablation due to repeated recording and erasing at the end of the recording region is significantly reduced by the addition of B. It is also understood that the addition of B widens the tolerance for the deviation of the recording beam power from the optimum power against ablation due to repeated recording and erasing. It was confirmed that this effect is remarkable particularly when the recording beam power level deviates from the optimum level in the higher side.

Thus, the optical disk carrying a recording film, the composition of which is defined by $(Ge_2Sb_2Te_5)_{1-a}B_a$, where $0 < a \leq 0.4$, exhibits superior recording and erasing characteristics, as well as high stability of performance against repeated recording and erasing.

EXAMPLE 2

Example 1 shows that the addition of B significantly suppresses the tendency of ablation caused by repeated recording and erasing at the end portion of the recording region. An experiment conducted by the inventors showed that the above-mentioned tendency of ablation caused by repeated recording and erasing is remarkably suppressed also by addition of C in an amount which meets the condition of $C \leq 40\%$, as is the case of addition of B. It was also confirmed that addition of C provides recording and erasing sensitivities, erasability and thermal stability which are sufficient for enabling the disk to be used as a rewritable optical disk. FIG. 9(b) shows the relationship between the level of the recording power and the length of the ablation portion at end of the recording region, i.e., the length of the portion in which the amplitude of the signal obtained by reproducing a recorded mark is decreased, as observed after 10,000 over-writing cycles conducted at 5 MHz. FIG. 9(b) shows the relationship between the ablation length of the terminal end portion and the recording power when $a$ in the formula $(Ge_2Sb_2Te_5)_{1-a}C_a$ is 0, 0.01, 0.05 and 0.3. From FIG. 9(b), it will be understood that the ablation due to repeated recording and erasing at the end of the recording region is significantly reduced by the addition of C. It is also understood that the addition of C widens the tolerance for the deviation of the recording beam power from the optimum power against ablation due to repeated recording and erasing. It was confirmed that this effect is remarkable particularly when the recording beam power level deviates from the optimum level in the higher side.

Thus, the optical disk carrying a recording film, the composition of which is defined by $(Ge_2Sb_2Te_5)_{1-\alpha}B_\alpha$, were $0<\alpha\leq 0.4$, exhibits superior recording and erasing characteristics, as well as high stability of performance against repeated recording and erasing.

EXAMPLE 3

A test piece having a recording film of a composition defined by $(Ge_xSb_yTe_z)_{1-\alpha}B_\alpha$, $x+y+z=1$, $0\leq\alpha\leq 0.8$, was prepared. The recording film was formed by vacuum evaporation. A test was conducted for the purpose of examining the influence of the recording power on the crystallization characteristic, amorphous-phase-forming characteristic and ablation at the end of recording region due to repeated recording and erasing. The thickness of the recording film was 60 nm. The protective layers on the substrate and on the recording film were made of ZnS in thicknesses of 150 and 200 nm, respectively. The reflective layer was formed from Au in thickness of 20 nm.

As explained before, the optical information recording medium of the present invention is required to meet various requirements: namely, high crystallization sensitivity, high amorphous-phase-forming sensitivity (crystallization speed 100 nsec or shorter to enable over-writing with single beam), high thermal stability of the amorphous state of the recording film and a reduction in the ablation at end of the recording region due to repeated recording and erasing. As a result of the above-mentioned test, it was confirmed that all these requirements are met when the composition range of the Ge-Sb-Te type ternary composition and the content of B satisfy the following conditions.

$(Ge_xSb_yTe_z)_{1-\alpha}B_\alpha$

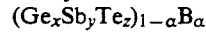

Figure 10:
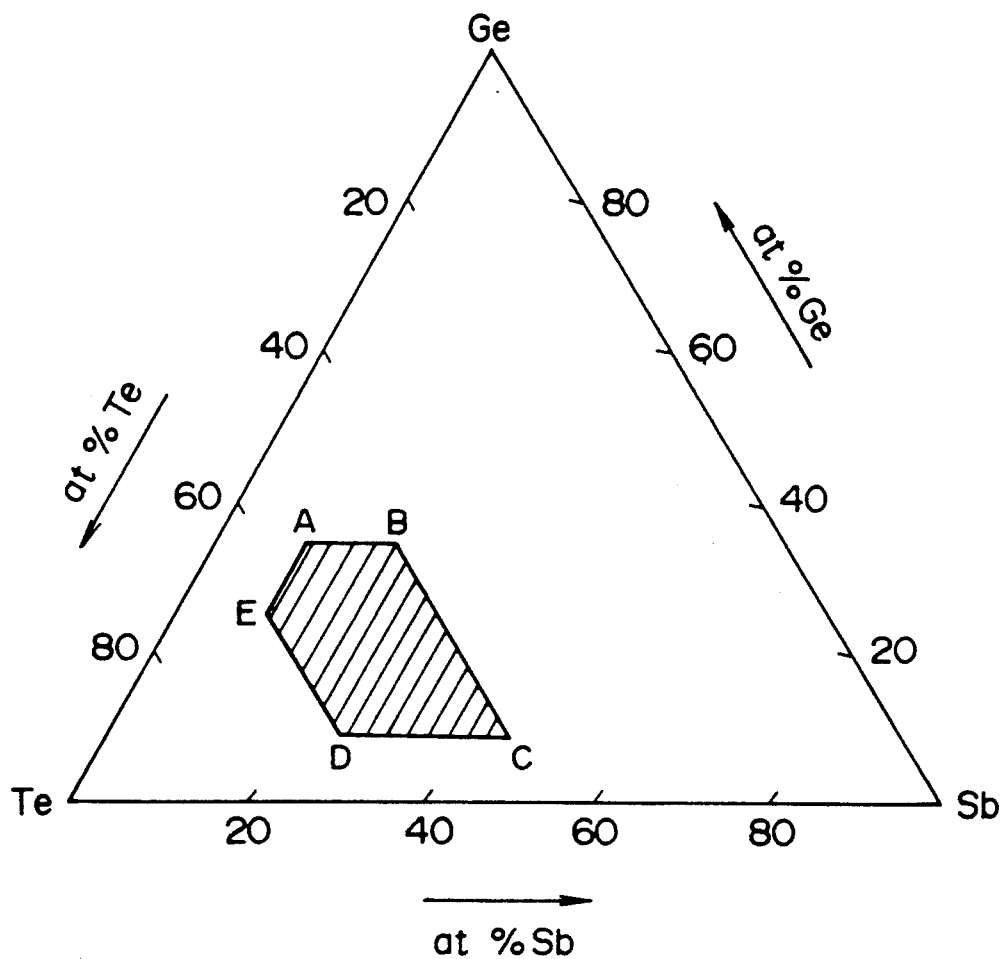
FIG. 10 illustrates a composition range of a Ge-Sb-Te-B type quarternary alloy suitable for use in the present invention.

$0.10\leq x\leq 0.35$
$0.10\leq y$
$0.45\leq z\leq 0.65$
$x+y+z=1$
$0<\alpha\leq 0.4$ The composition range specified above is obtained by adding not greater than 40 at % of B to a composition which falls within the area or region surrounded by lines interconnecting points A, B, C, D and E in FIG. 10.

A discussion will be given hereinafter on the ratio of contents of elements other than B, i.e., contents of Ge, Sb and Te. As explained before, the composition ratio is in the vicinity of the region of $(GeTe)_\alpha(Sb_2Te_3)_{1-\alpha}$ shown in FIG. 2 which provides a high crystallization speed, with the Ge content determined such that the recording film can stably exists even in amorphous state of the film (see FIG. 3). Thus, the composition inherently exhibits a comparatively high recording/erasing repetition characteristic even when B is not added. It will be understood that addition of B further improves the characteristics of the recording film as a recording layer of an optical disk.

EXAMPLE 4

A test piece having a recording film of a composition defined by $(Ge_xSb_yTe_z)_{1-\alpha}C_\alpha$, $x+y+z=1$, $0\leq\alpha\leq 0.8$, was prepared. The recording film was formed by vacuum evaporation. A test was conducted for the Purpose of examining the influence of the recording power on the crystallization characteristic, amorphous-phase-forming characteristic and ablation at the end of recording region due to repeated recording and erasing. The thickness of the recording film was 60 nm. The protective layers on the substrate and on the recording film were made of ZnS in thicknesses of 150 and 200 nm, respectively. The reflective layer was formed from Au in thickness of 20 nm.

It was confirmed that various requirements: namely, high crystallization sensitivity, high amorphous-phase-forming sensitivity (crystallization speed 100 nsec or shorter to enable over-writing with single beam), high thermal stability of amorphous state of the recording film and reduction in the ablation at end of the recording region due to repeated recording and erasing are met when the composition range of the Ge-Sb-Te type ternary composition and the content of C satisfy the following conditions.

$(Ge_xSb_yTe_z)_{1-\alpha}C_\alpha$

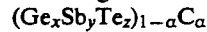

$0.10\leq x\leq 0.35$
$0.10\leq y$
$0.45\leq z\leq 0.65$
$x+y+z=1$
$0<\alpha\leq 0.4$

EXAMPLE 5

Figure 11A:
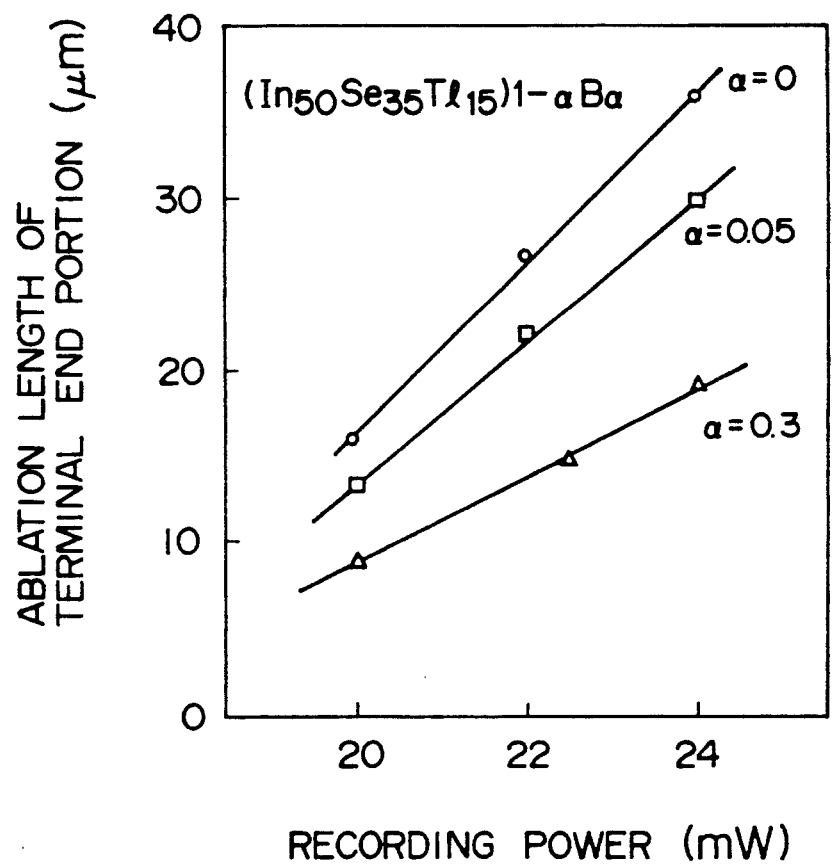
Figure 11B:
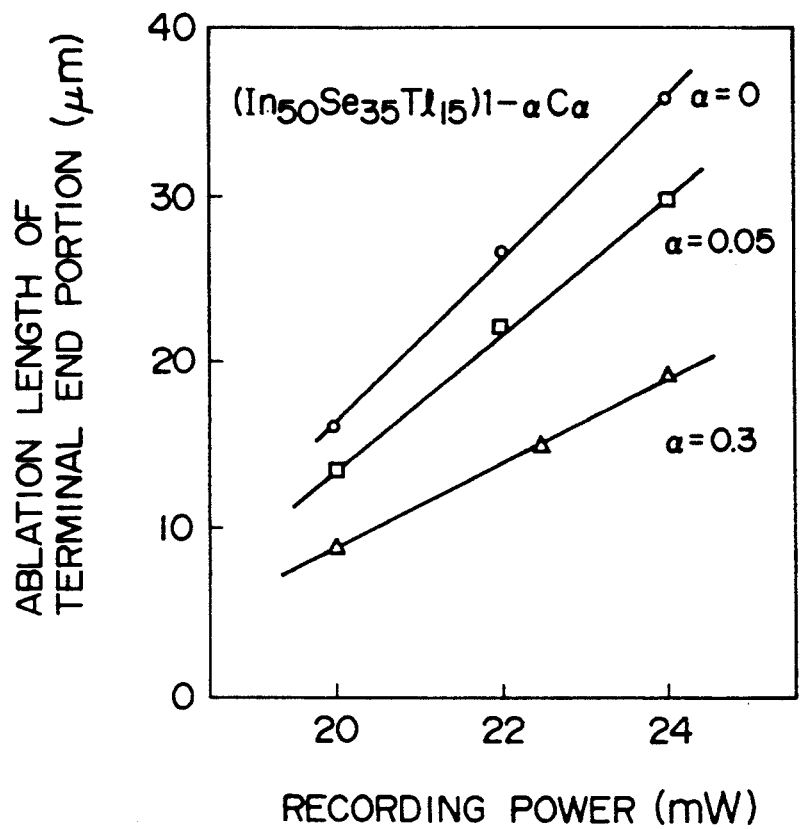

Examples 3 and 4 show that the tendency of ablation at ends of the recording region, caused by repeated recording and erasing, is remarkably suppressed by addition of B or C to the Ge-Sb-Te type ternary composition of the recording film. Tests were conducted also on other materials of the recording film mainly composed of Te or In, e.g., Te-Ge, Te-Ge-Sn, Te-Ge-Sn-Au, Sb-Te, Sb-Se-Te, In-Te, In-Se, In-Se-Tl, In-Sb, In-Sb-Se and In-Se-Te, to each of which B or C is added, to examine the effect of addition of B or C. Suppression of tendency for the ablation at the end of the recording region caused by repeated recording and erasing was confirmed in each case. FIGS. 11(a) and 11(b) show, by way of example, the length of the ablation portion of the recording region after 1000 continuous cycles of over-writing on each of recording films made of $In_{50}Se_{35}Tl_{15}$-B and $In_{50}Se_{35}Tl_{15}$-C which enable over-writing with a single beam. From FIGS. 11(a) and 11(b), it will be understood that the ablation is remarkably suppressed by the addition of B or C. It was also confirmed that the suppression of ablation can be attained by addition of B or C also in the cases of recording films which do not allow over-writing with single beam due to their comparatively low crystallization speed or with which the over-writing is difficult. For instance, in the case of an optical disk having a recording film of a composition expressed by Te-Ge-Sn-Au, the crystallization speed of the recording film is comparatively low so that over-writing with a single beam is impossible or difficult. This type of recording film, however, can be used for repeated recording and erasing provided that two different laser beams: one for recording and one for erasing, are used and that the laser spot for erasing is determined to be comparatively large as compared with the laser beam for recording, as disclosed in the specification of Japanese Patent Application No. 60-112420. Thus, an appreciable effect of addition of B or C in suppressing the ablation tendency at the end of recording region due to repeated recording and erasing was confirmed also in the case of the recording film of Te-Ge-Sn-Au type recording film.

EXAMPLE 6

In most cases, the recording film of the phase-change type optical disk is in amorphous state immediately after the formation of the film. Usually, a phase-change type optical disk is used such that the amorphous state and crystalline state correspond, respectively, to the state holding recorded information and the state in which information has been erased. This essentially requires that the entire area of the disk is crystallized before the disk is put to use. Such an overall crystallization is conveniently effected by a high-speed disk crystallization device of the type shown in Japanese Patent Laid-Open No. 60-106031. This crystallization device irradiates the recording film with a moving laser beam of a predetermined spot shape so as to crystallize the entire area of the recording film at a high speed.

Figure 12:
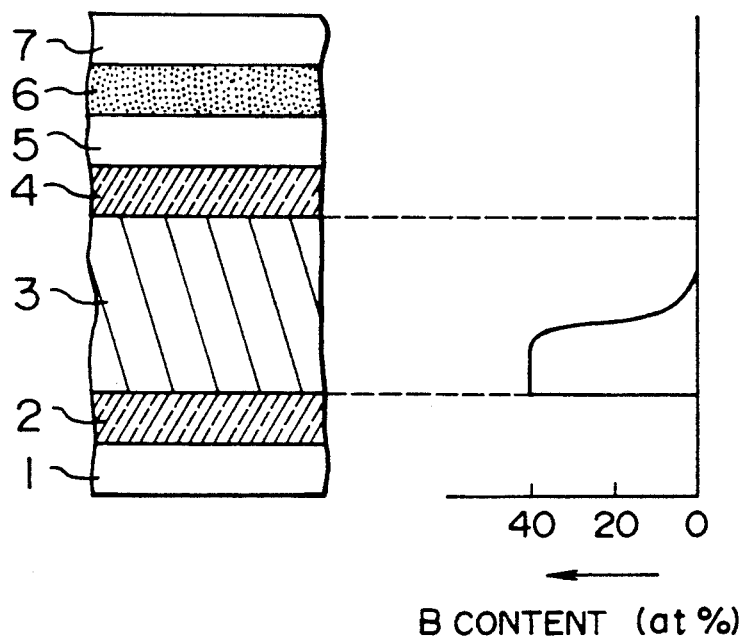
FIG. 12 is an illustration of the thicknesswise distribution of B in the recording film.

As explained before, the addition of B or C produces an effect to suppress ablation at the recording film mainly composed of Te or In caused by repeated recording and erasing. It was also confirmed that the speed of crystallization of the recording film is not substantially impaired by the addition of B or C, provided that the amount of B or C is suitably determined, e.g., not to exceed 40%. The inventors have found, however, that the addition of B or C causes another problem: namely, restriction of the range of the erasing laser power, i.e., a reduction in the tolerance of the laser power for erasing, in the high-speed crystallization performed by the above-mentioned high-speed crystallization device. More specifically, it has been found that the addition of B or C tends to cause a cracking in the recording film when the crystallization is effected by the above-mentioned crystallization device with a power level which is greater than the optimum level. The present inventors have conducted various studies to deal with this problem, and found that the above-described problem can be overcome by forming the recording film such that the film has at least a thickness-wise portion which does not contain the added element, i.e., B or C. FIG. 12 shows an example of the thickness-wise distribution of B in the recording thin film. This type of film can be formed by vacuum evaporation employing different evaporation sources for the basic material of the film and for B while controlling the evaporation rates of these films independently.

EXAMPLE 7

Examples 1 and 2 show that a significant effect is produced in suppressing the ablation tendency of the recording film of $Ge_2Sb_2Te_5$ type, by addition of B or C to the film material $Ge_2Sb_2Te_5$. The inventors have made experiments to examine the effect in the suppression of ablation tendency caused by repeated recording and erasing, produced by provision of a layer of B or C on one or both sides of the recording film, instead of adding B or C to the material of the recording film.

Figure 1B:
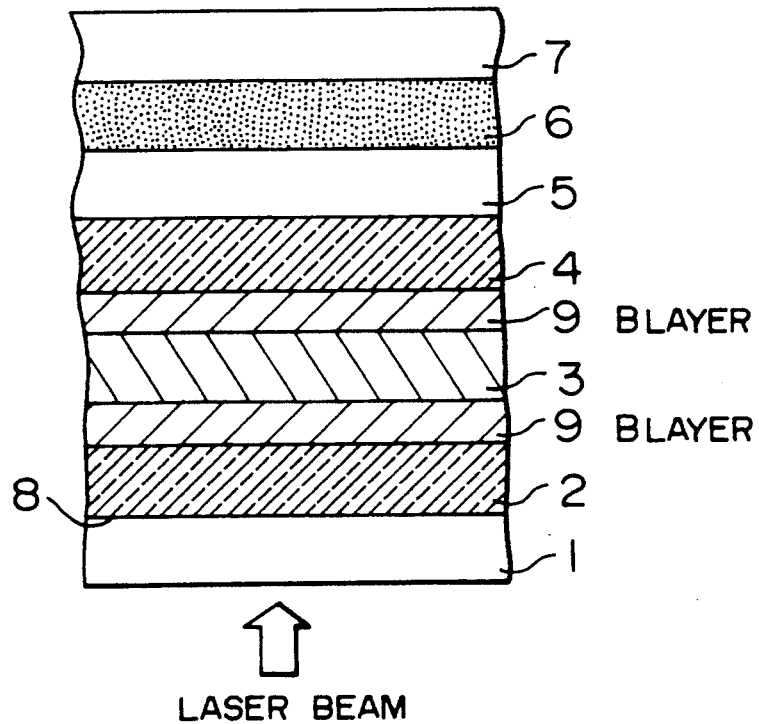
Figure 13:
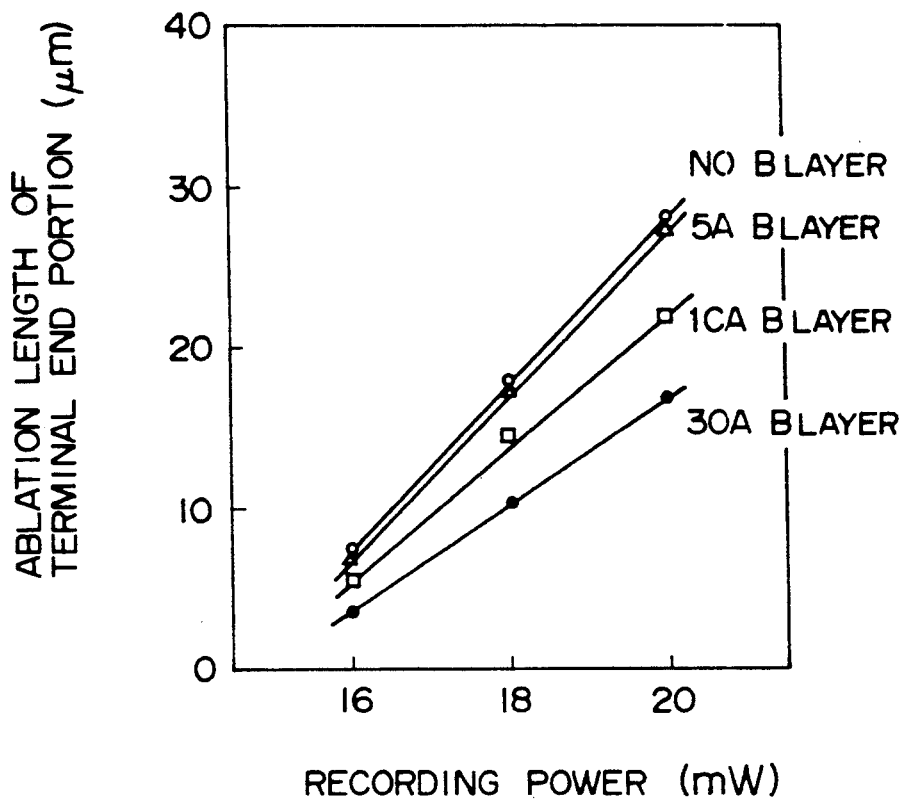
FIG. 13 is an illustration of an effect on the prevention of ablation of characteristics by repetition of recording and erasing, produced by provision of a B layer.

A test was conducted using an optical disk having a $Ge_2Sb_2Te_5$ recording film and B layers on both sides of the recording film. The optical disk was subjected to 10,000 cycles of recording and erasing in over-writing mode. The relationship between the thickness of the B layers and the length of the end portion of the recording region degraded by repeated recording an erasing is shown in FIG. 13. The construction of this disk is as shown in FIG. 1(b). The recording film had a thickness of 60 nm. The protective layers on the substrate and on the recording film were made of ZnS in thicknesses of 150 nm and 200 nm, respectively. The reflective layer was formed from Au to have a thickness of 20 nm.

As will be seen from FIG. 13, the provision of the B layer effectively suppresses the tendency of ablation of the recording film caused by repeated recording and erasing. It was found that the tendency for destruction of the recording film is increased when the thickness of the B layer is increased beyond 10 nm. It is thus understood that the thickness of the B layer is preferably not greater than 10 nm. An appreciable effect in suppressing the ablation due to repeated recording and erasing was observed also when the B layer is provided only on one side of the $Ge_2Sb_2Te_5$ recording film.

Similarly, appreciable effect in suppressing the ablation due to repeated recording and erasing was observed also when a C layer is formed on only one or on each side of the $Ge_2Sb_2Te_5$ recording thin film. Preferred thickness of the C layer was found to be 10 nm or smaller also in this case.

The inventors also made a study to determine the conditions for broadening the range of the recording film composition without impairing the crystallization sensitivity and amorphous-phase-forming sensitivity while enjoying the advantage of the provision of the B or C layer, i.e., suppression in the ablation of the recording region of the film caused by repeated recording and erasing. As a result, the inventors have found that these requirements are satisfied when the composition of the Ge-Sb-Te ternary composition, expressed by $Ge_xSb_yTe_z$, meet the following conditions, while the thickness of the B or C layer provided on one or each side of the recording film is not greater than 10 nm.

$Ge_xSb_yTe_z$ 

$0.10 \leq x \leq 0.35$
$0.10 \leq y$
$0.45 \leq z \leq 0.65$
$x+y+z=1$

Tests were also conducted using other recording films composed mainly of Te or In, e.g., a recording film of $In_{50}Se_{35}Tl_{15}$ which enables over-writing with a single beam, by providing a B layer on only one or each side of the recording film. Appreciable effects of suppressing the tendency of ablation caused by operated recording and erasing were observed also in these cases.

EXAMPLE 8

Example 7 shows that the tendency for the recording film to be degraded at ends of recording region due to repeated recording and erasing can be suppressed by providing a B or C layer on only one or on each side of the Ge-Sb-TE type recording film. A discussion will be made hereinafter as to a combination of Example 7 and 5. More specifically, an experiment was conducted with optical disk in which B or C is added to the material of the recording film and a B layer or a C layer is provided on only one or on each side of the recording film. All these optical disks exhibited remarkable suppression of ablation in the ends of the recording region attributable to repeated recording and erasing, thus proving the effects produced by addition of B or C and by provision of a B or C layer on one or each side of the recording film.

EXAMPLE 9

Example 7 shows that the tendency for the recording film to be degraded at ends of recording region due to repeated recording and erasing can be suppressed by providing a B or C layer on only one or on each side of the Ge-Sb-Te type recording film. A discussion will be made on an attempt to suppress the ablation tendency at the end of the recording region attributable to repeated recording and erasing, by adding B or C to the material of the protective layer which is formed in contact with the recording film.

Figure 14:
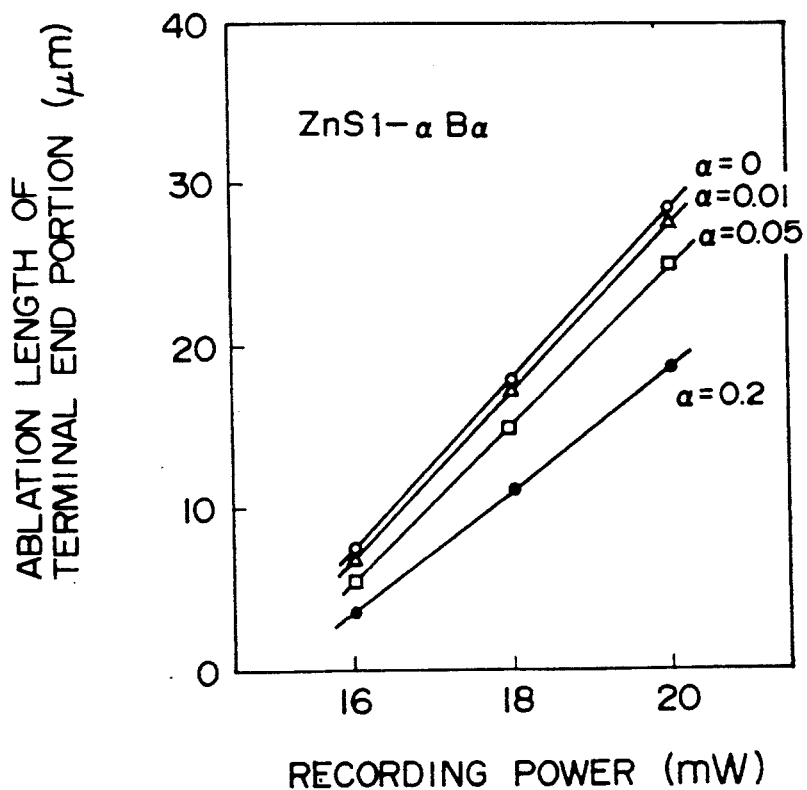
FIG. 14 is an illustration of an effect on the prevention of degradation of characteristics by repetition of recording and erasing, produced by provision of a protective layer containing B.

A test was conducted using an optical disk having a $Ge_2Sb_2Te_5$ recording film and protective films of a composition expressed by ZnS-B on both sides of the recording film. The optical disk was subjected to 10,000 cycles of recording and erasing in an over-writing mode. The relationship between the B content of the material of the protective layers and the length of the end portion of the recording region degraded by repeated recording and erasing is shown in FIG. 14. The recording film had a thickness of 60 nm. The protective layers on the substrate and on the recording film were made of ZnS in thicknesses of 150 nm and 200 nm, respectively. The reflective layer was formed from Au to have a thickness of 20 nm.

As will be seen from FIG. 14, the addition of B to the material of the protective layer effectively suppresses the tendency of ablation of the recording film caused by repeated recording and erasing. Appreciable effect in suppressing the ablation tendency was obtained even when B is added to only one of the protective layers on the recording film.

Similarly, the effect of suppression of the ablation tendency caused by the repeated recording and erasing was obtained also when a protective layer of a material expressed by ZnS-C is used on at least one side of the $Ge_2Sb_2Te_5$ recording film.

The inventors also made a study to determine the conditions for broadening the range of the recording film composition without impairing the crystallization sensitivity and amorphous-phase-forming sensitivity while enjoying the advantage produced by the provision of the protective layer or layers containing B or C, i.e., suppression in the ablation of the recording region of the film caused by repeated recording and erasing. As a result, the inventors have found that these requirements are satisfied when the composition of the Ge-Sb-Te ternary composition, expressed by $Ge_xSb_yTe_z$, meet the following conditions.

$Ge_xSb_yTe_z$

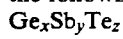

$0.10 \leq x \leq 0.35$
$0.10 \leq y$
$0.45 \leq z \leq 0.65$
$x+y+z=1$

Although ZnS has been specifically mentioned as the base material of the protective layer, this is not exclusive and the above-described effect produced by addition of B or C to the material of the protective layer, i.e., suppression of the ablation tendency caused by repeated recording and reduction at ends of the recording region of the recording film, can be attained when the protective layer is made of a dielectric material selected from a group of $Al_2O_3$, SiO, $SiO_2$, $TeO_2$, $MoO_3$, $WO_3$, $PbF_2$, $MgF_2$, SiN or the like, or a suitable combination of two or more of these elements.

It is not essential that B or C thus added is uniformly distributed or dissolved in solid state over the entire portion of the protective layer. What is important is to make B or C exist in the vicinity of the interface defined between the recording film and the protective layer.

Tests were also conducted using other recording films composed mainly of Te or In, e.g., a recording film of $In_{50}Se_{35}Tl_{15}$ which enables over-writing with a single beam, by providing a protective layer containing B or C on only one or each side of the recording film. Appreciable effects of suppressing the tendency of ablation caused by operated recording and erasing were observed also in these causes.

EXAMPLE 10

Example 9 shows that the provision of a protective layer containing B or C on each or on only one side of the Ge-Sb-Te type recording film produces an effect to suppress the tendency for the end portions of the recording region of the recording film to be degraded by the repeated recording and erasing. A discussion will be done as to combination of Examples 9 and 5, i.e., an optical recording medium in which B or C is added to the material of the recording film and a protective layer containing B or C is provided on one or each side of the recording film. An experiment showed that such a combination produces an appreciable effect in suppressing the ablation tendency of the recording film caused by repetition of recording and erasing.

What is claimed is:

1. An optical information recording medium comprising, at least, a substrate and a recording film composition on said substrate, which recording film composition transforms repetitively from amorphous phase into crystalline phase or vice versa to make it possible to effect repetition of recording and erasing, wherein the recording film composition is expressed by $(Ge_xS_by Te_z)_{1-a}B_a$ meeting the following conditions:

$0.10 \leq x \leq 0.35$
$0.10 \leq y$
$0.45 \leq z \leq 0.65$
$x+y+z=1$
$0.05 \leq a \leq 0.4$ such optical information recording medium exhibiting excellent performance against repeated recording and erasing while widening a range of fluctuation of recording power thereof.

2. An optical information recording medium comprising, at least, a substrate and a recording film composition on said substrate, which recording film composition transforms repetitively from amorphous phase into crystalline phase or vice versa to make it possible to effect repetition of recording and erasing, wherein the recording film composition is expressed by $(Ge_2Sb_2Te_5)_{1-a}B_a$ meeting the following condition:

$0.05 \leq a \leq 0.4$.

3. An optical information recording medium comprising, at least, a substrate and a recording film composition on said substrate, which recording film composition transforms repetitively from amorphous phase into crystalline phase or vice versa to make it possible to effect repetition of recording and erasing, wherein the recording film composition is expressed by $(Ge_xS_by Te_z)_{1-a}C_a$ meeting the following conditions:

$0.10 \leq x \leq 0.35$
$0.10 \leq y$ $0.45 \leq z \leq 0.65$ $x + y + z = 1$ $0.05 \leq \alpha \leq 0.4$ such optical information recording medium exhibiting excellent performance against repeated recording and erasing while widening a range of fluctuation of recording power thereof.

4. An optical information recording medium comprising, at least, a substrate and a recording film composition on said substrate, which recording film composition transforms repetitively from amorphous phase into crystalline phase or vice versa to make it possible to effect repetition of recording and erasing, wherein the recording film composition is expressed by $(Ge_2Sb_2Te_5)_{1-\alpha}C_\alpha$ meeting condition:

$0.05 \leq \alpha \leq 0.4.$

* * * * *

UNITED STATES PATENT AND TRADEMARK OFFICE
CERTIFICATE OF CORRECTION

PATENT NO. : 5,294,523

DATED : March 15, 1994

INVENTOR(S) : Ken'ichi NAGATA et al

It is certified that error appears in the above-identified patent and that said Letters Patent is hereby corrected as shown below:

Title Page, [75] Inventors, the first inventor name should read: -- Ken'ichi Nagata --.

Signed and Sealed this

Eleventh Day of October, 1994

Attest:

BRUCE LEHMAN

*Attesting Officer*    *Commissioner of Patents and Trademarks*